Figure 1:
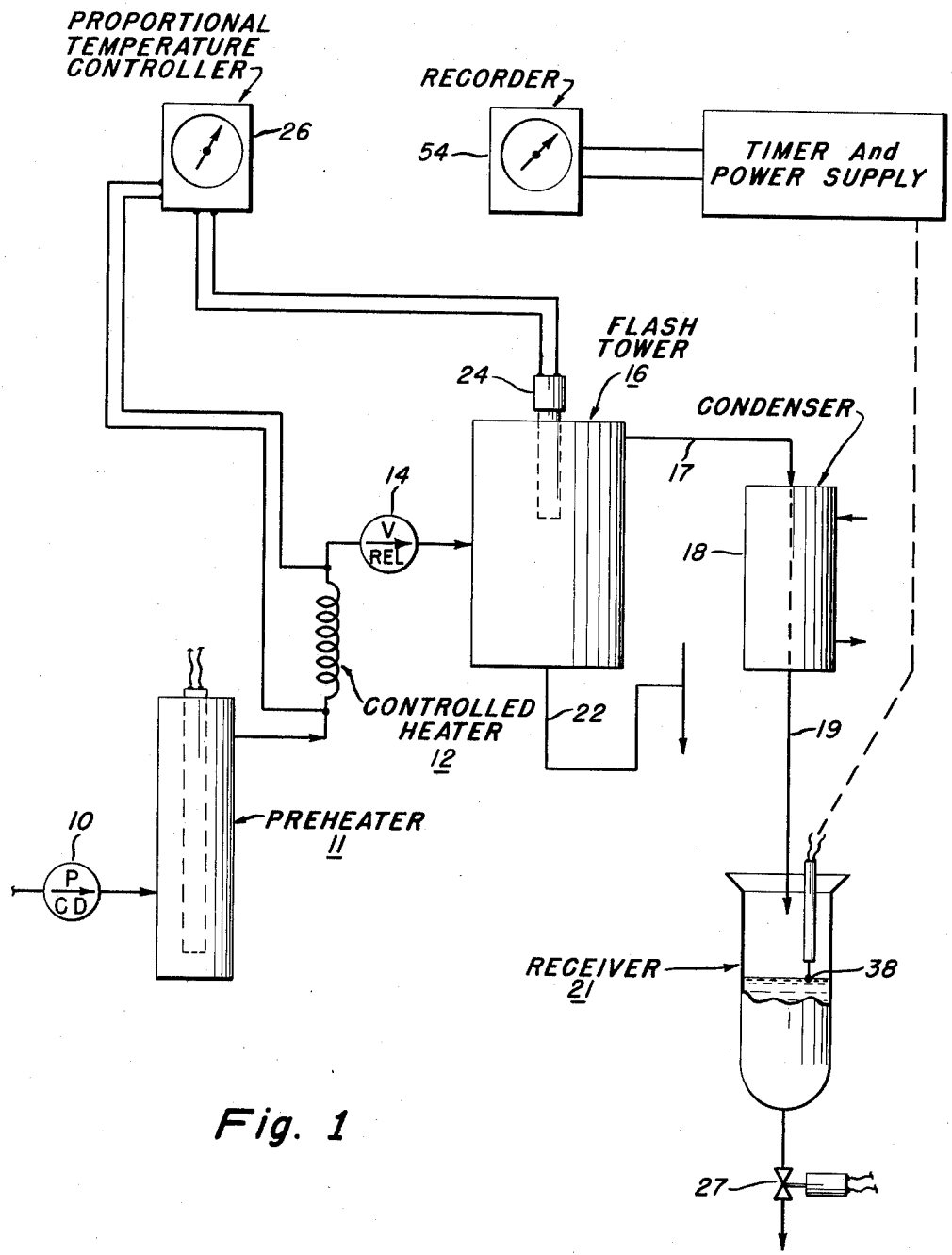

Dec. 7, 1965 S. F. KAPFF 3,221,542
METHOD AND APPARATUS FOR DETERMINING THE RELATIVE AMOUNT
OF A PRODUCT DISTILLING AT A SELECTED TEMPERATURE
Filed Feb. 11, 1963 2 Sheets-Sheet 2

INVENTOR.
Sixt Frederick Kapff

United States Patent Office 3,221,542
Patented Dec. 7, 1965

3,221,542
METHOD AND APPARATUS FOR DETERMINING THE RELATIVE AMOUNT OF A PRODUCT DISTILLING AT A SELECTED TEMPERATURE
Sixt Frederick Kapff, Homewood, Ill., assignor to Standard Oil Company, Chicago, Ill., a corporation of Indiana
Filed Feb. 11, 1963, Ser. No. 257,622
4 Claims. (Cl. 73—53)

This invention relates to a method and apparatus for determining the relative amount of a multi-component product distilling at a selected temperature. More particularly, this invention relates to a method and apparatus for automatically determining the percent of a petroleum fraction distilling at a selected temperature.

In the operation of various distillation units, it is important that information be available rapidly on the distillation properties of the feed and/or product streams. At present such information is typically obtained by correlation of results derived from samples taken for laboratory analysis. Results obtained in this manner are disadvantageous in that they either are not obtained frequently enough or else they lag the process too much to permit the best control. The problem of data lag is accentuated and becomes particularly acute where large modern process distillation units are operated by computer control.

Accordingly, an object of the present invention is a method and apparatus to provide information on the distillation properties of multi-component feed or product streams continuously and rapidly so that appropriate action can be taken when feed or product characteristics change to prevent off-specification products. A further object of this invention is a system which is simple in operation and adapted for routine determination. Another object of the invention is a method and apparatus capable of automatically and rapidly measuring and recording the relative amount of a multi-component product distilling at a given temperature. A still further object is a method and apparatus for measuring and recording the percent of a petroleum fraction distilling at a given temperature. Other objects of the invention will be apparent from the detailed description thereof.

According to the present invention, an advantageous method and apparatus have now been found which will directly measure and record the relative amount of a multi-component feed or product stream distilling at a known constant temperature in a continuous and rapid fashion.

The invention comprises a method and apparatus for ascertaining the relative amount of a multi-component liquid sample stream distilling at a known temperature. The preferred apparatus includes a flash chamber into which liquid sample flows at a known volumetric rate for flash distillation into a vapor and a liquid phase at the known temperature, pump means to flow the liquid sample stream into the flash chamber at the known rate, heating means to maintain the temperature constant in the flash chamber, means to condense the vapor phase in the absence of the liquid phase, means to accumulate the resulting condensate, and means to measure and record the time necessary to collect a predetermined volume of condensate. This time is then correlated with the known volumetric rate of sample flow to determine the relative amount of the sample stream which has distilled at the selected temperature.

The preferred system employs the principle of measuring the portion of the flowing liquid sample that is vaporized upon flash vaporization at a selected temperature. When the sample flows through the system at a constant volumetric rate, the time necessary to accumulate a predetermined amount of withdrawn and condensed vapor portion is a measure of, and is inversely proportional to, the percent of the product distilling at the selected temperature. Various methods and systems of apparatus may be employed to measure and record the time necessary to accumulate a predetermined volume of sample. Particular examples of methods and systems of apparatus which may be employed will become apparent from the more detailed description of the invention which follows.

As used throughout this specification and claims, the term "flash distillation" means the process or processees commonly designated in the art by that and similar terms such as equilibrium distillation, equilibrium vaporization, and flash vaporization. The mechanism of this type of distillation is characterized by the fact that vapors are not removed as they are formed but are kept in physical contact with the remaining liquid until heating is completed in contrast to other distillation methods wherein vapors are withdrawn as soon as they are formed.

Referring now to the drawings, FIGURE 1 is a schematic representation of a preferred embodiment of apparatus for monitoring percent of a petroleum fraction distilling at a selected temperature.

Figure 2:
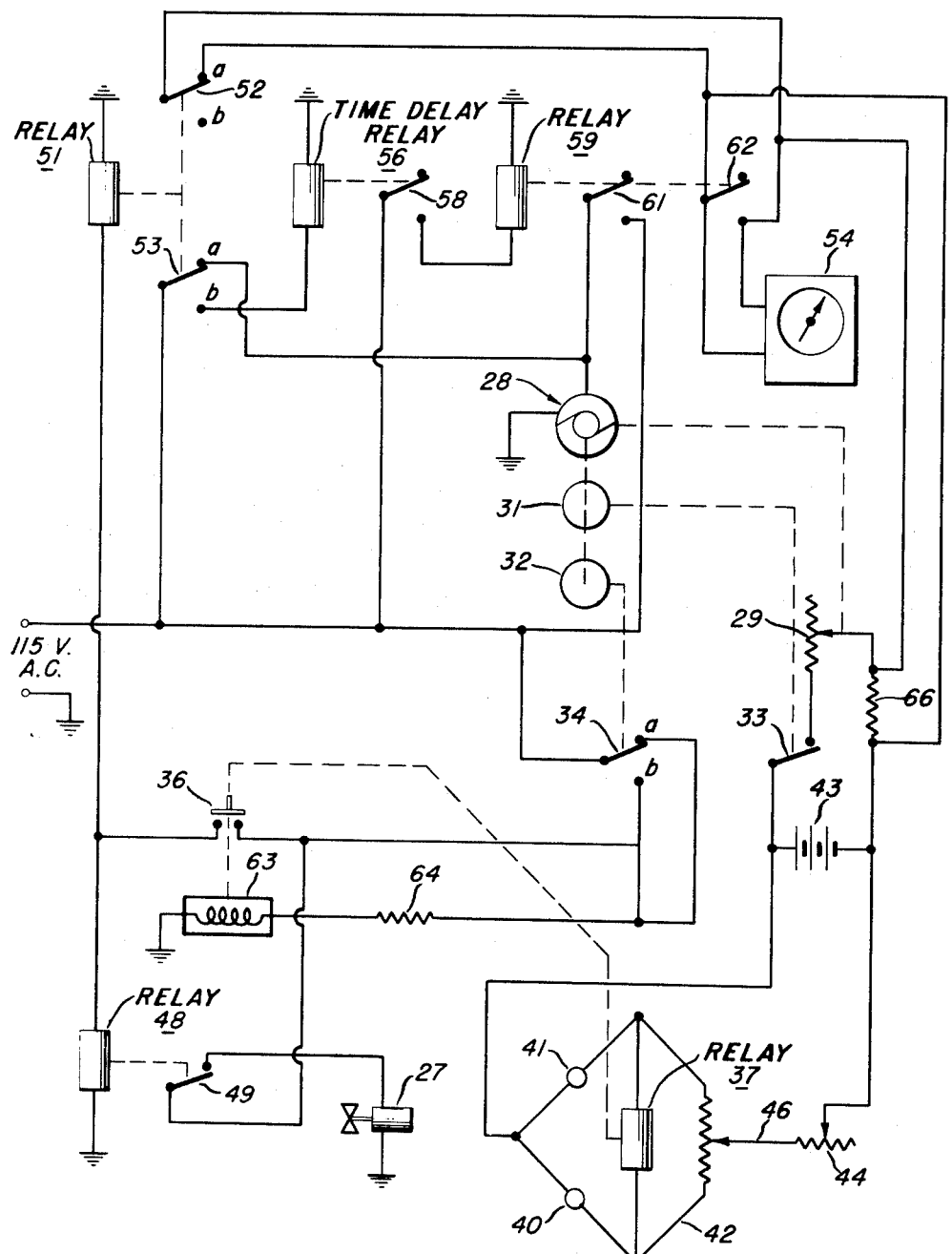

FIGURE 2 is a schematic representation of the preferred electrical system employed in the apparatus illustrated in FIGURE 1.

In the embodiment illustrated in FIGURE 1 liquid sample is pumped into the system at a known constant volumetric rate by constant delivery pump 10. Sample flows through heater 11 which preheats the stream to a temperature approaching that at which the flash distillation is to be made and into controlled heater 12 which maintains the temperature constant in flash chamber 16 at a pre-selected value by adjusting the heat content of the sample stream in response to a signal received from resistance thermometer 24 through proportional temperature controller 26. Resistance thermometer 24 is located in the vapor space of flash chamber 16.

After leaving controlled heater 12, sample passes through pressure relief valve 14 prior to entry into flash chamber 16. Valve 14 is set to provide sufficient back pressure (e.g., 400 p.s.i. for petroleum fraction sample streams) to maintain the sample stream in the liquid phase and prevent premature flashing. Sample then passes to flash chamber 16 where it is equilibrium flash distilled at atmospheric pressure and at the pre-selected temperature. For petroleum fractions the pre-selected temperature typically will be within the range of 150 to 650° F. Vapors disengaged from liquid are taken off through line 17 into water cooled condenser 18. Liquid residue is withdrawn through line 22 and discarded from the system.

Condensed vapors leaving condenser 18 pass into receiver 21 through line 19 and accumulate when valve 27 is in the closed position. Receiver 21 contains level sensor probe 38 positioned at a point such that it is touched by liquid upon accumulation of a predetermined volume. Level sensor probe 38 consists of a sensing thermistor and a reference thermistor mounted one above the other. Other level sensing means are available and may be employed. By means of the electrical circuit illustrated schematically in FIGURE 2, time is monitored beginning with the closing of valve 27; and when the level of accumulated condensate reaches sensor 38 a signal is sent to recorder 54 enabling it to record time necessary to accumulate the predetermined volume, i.e., the time elapsed since closing of valve 27. This time is inversely proportional to the percent of the liquid sample distilling at the selected temperature.

FIGURE 2 shows in schematic form the preferred electrical circuit diagram of the level detection read-out system employed to control the apparatus of FIGURE 1 to measure and record the time necessary to accumulate a predetermined volume of condensate. In FIGURE 2 timer motor 28 runs essentially continuously and moves potentiometer 29 which regulates current in the circuit to recorder 54 and cams 31 and 32. These cams operate switches 33 and 34, respectively, according to a predetermined program. At the start of a cycle, switch 34 moves to position $b$, contacts 36 of sensitive relay 37 being open. This provides power to close normally-open valve 27 and liquid then begins to accumulate in receiver 21. Liquid is accumulated until level sensor probe 38 is touched with liquid. The sensing and reference thermistor elements of level sensor probe 38 are shown as elements 40 and 41 in the bridge circuit 42 of FIGURE 2. This bridge receives its power from power supply 43. Sensitivity of the bridge is adjusted through resistance 44 and the bridge is balanced by potentiometer 46. Bridge balance is detected by sensitive relay 37. When liquid reaches level sensor probe 38, bridge 42 is thrown out of balance causing relay 37 to close contacts 36.

At this point, several events happen simultaneously: (1) relay 48 opens switch 49 removing power from valve 27 permitting it to open and drain receiver 21; (2) relay 51 is energized moving switches 52 and 53 to position $b$. The opening of switch 52 unshorts the input to recorder 54 permitting it to record. Switch 53 removes power from timer motor 28 stopping it while the recorder reading is being taken. In position $b$, switch 53 provides power to time delay relay 56. After thirty seconds, this relay closes switch 58 which activates relay 59 to close switches 61 and 62. Switch 61 restarts the timer motor 28 and switch 62 re-shorts the recorder input. Timer motor then completes its cycle at which point switch 33 is opened and switch 34 moves to position $a$. In moving from position $b$, switch 34 removes power from valve 27 opening it and dumping receiver 21 in case the level sensor probe has not already done so. In position $a$, switch 34 provides power to the reset coil 63 of sensitive relay 37 through resistor 64 to open contacts 36. This also opens relay 51 and returns the system to the starting position. The system then is ready to repeat the cycle with the closing of switch 33 and the movement of switch 34 from position $a$ to position $b$. Switch 33 is provided as protection for the power supply 43 and potentiometer 29. To avoid snapback and resetting, potentiometer 29, in this embodiment, is a circular potentiometer with no stops on the wiper. It must pass from one end of the pot to the beginning through a short distance. While this is happening switch 30 is held open.

Resistor 66 is provided to linearize the signal to recorder 54. In this circuit as potentiometer 29 moves, the current in the recorder circuit varies inversely with the time. Since the time to distill a predetermined volume varies inversely with the distillation rate, then a measure of recorder circuit current will give a linear record of the percent distilled. The voltage drop occasioned by the current through resistor 66 is, accordingly, measured on recorder 54.

A detailed description of particular elements employed in the specific model illustrated in the circuit of FIGURE 2 is as follows:

Industrial timer (2 adj switches and cams) 3 min. cycle, shaft coupled to potentiometer #29
43 power supply (video type SR-200A) (set to 10 v. D.C. output)
37 sensitrol type 705
48 and #51 P and B sealed relay type KR-4335
59 P and B sealed relay type KR-4085
66 3.2Ω precision resistor
64 750Ω20W
29 continuous rotating potentiometer, 0–3000Ω, type RV 1⅝–S231, 1JC4788, technology instrument corporation
46 0–1K helipot, ten turn
44 0–5K mallory, one turn
27 asco solenoid valve, cat. 826231
56 amperite time delay relay, #115N030, 30 sec. delay
40 and #41 VECO, #41A2 thermistors
26 temperature controller, Bayley Instrument Co., Model 103

In addition to the preferred method and apparatus illustrated in FIGURE 2 for determining and recording the time necessary to accumulate a predetermined volume of condensed vapor sample, other methods of making this determination are possible. For example, a nonlinear potentiometer can be used as the voltage divider since the data to be collected is non-linear. Also a previously constructed cam can be used to provide the non-linear motion to a linear potentiometer. Further, as will be obvious to one skilled in the art, the liquid withdrawn from the flash distillation zone may be accumulated, rather than the vapor, as a measure of the percent of the sample stream distilling at the selected temperature. Such a system could, for example, be achieved using the apparatus illustrated in FIGURE 1 and FIGURE 2 by positioning receiver 21 to accumulate liquid withdrawn through line 22 rather than condensed vapor flowing through line 19. The time necessary to accumulate a predetermined amount of liquid in receiver 21 would then be directly, rather than inversely, proportional to the percent of the sample stream distilling.

To operate the illustrated preferred apparatus, power is supplied to all elements and liquid sample is fed to the pump inlet. Sample flow rate is then set, the level sensing bridge is balanced, and the temperature control is set at the selected temperature. After a short warm-up, the instrument will read the percent distilling at rapid intervals reoccurring every 3–4 minutes with an accuracy on the order of two percent distilled. If feed stock characteristics change, a new reading will be reached in a short time generally on the order of 5 minutes. Typical operating conditions are as follows:

| | |
|---|---:|
| Feed rate _____ cc./min__ | 30 |
| Preheater (11) _____ watts__ | 200–400 |
| Control heater (12) _____ do____ | 0–400 |
| Relief valve (14) setting _____ p.s.i__ | 400 |
| Range, Temp., ° F. _____ | 150–650 |
| Range, percent Off _____ | 10–90 |

Table 1 reports the percent of four different feed stocks distilling at various selected temperatures determined with the apparatus illustrated schematically in FIGURE 1 and FIGURE 2. The several feed stocks were as follows:

(1) Heater oil +5% furnace oil
(2) Heater oil +10% furnace oil
(3) Heater oil +20% furnace oil
(4) Heater oil +5% heavy naphtha.

TABLE 1

*Percent distilled*

| | | | | |
|---|---|---|---|---|
| 1_____ | 432° F. *16 | 452° F. 43 | 470° F. 77 | ------------ |
| 2_____ | 457° F. 44 | 466° F. 59 | 478° F. 78 | 481° F. 85 |
| 3_____ | 460° F. 35 | 475° F. 54 | 482° F. 64 | 497° F. 89 |
| 4_____ | 400° F. 14 | 417° F. 23 | 413° F. 37 | 443° F. 55 |

*Average volume percent distilled determined from several recordings made approximately three minutes apart.

The method and apparatus of the present invention also permit rapid determination of the equilibrium flash vaporization curve of a material by changes in the temperature setting to cover the boiling range of the feed stock sample. From a curve obtained in such manner the customary ASTM curve can be calculated.

Thus, having described the invention, what is claimed is:

1. An apparatus for determining the percent of a multi-component liquid sample stream distilling at a known constant temperature and pressure which apparatus comprises:
   (a) a flash chamber to flash distill at least a portion of said liquid sample stream into a vapor phase and liquid phase, said chamber having an inlet and a vapor outlet and a liquid outlet;
   (b) a temperature sensing element positioned in said flash chamber to sense the temperature of said vapor phase;
   (c) a constant delivery pump to flow said liquid sample stream into said flash chamber through said chamber inlet at a known constant volumetric rate;
   (d) controlled heater means to impart heat to said sample stream in response to a signal from said temperature sensing element in said flash chamber to maintain the temperature in said flash chamber at said known constant temperature;
   (e) pressure valve means interposed said controlled heater means and said flash chamber to exert a differential pressure on said sample stream sufficient to keep said sample in the liquid phase up-stream from said valve means;
   (f) means to withdraw said liquid phase from said flash chamber liquid outlet;
   (g) means to withdraw said vapor phase from said flash chamber vapor outlet;
   (h) means to condense said withdrawn vapor phase;
   (i) a receiver having a bottom outlet therein and a liquid level sensing probe located therein at a predetermined position, said receiver being positioned and adapted to collect said withdrawn and condensed vapor phase;
   (j) receiver valve means in said receiver outlet;
   (k) electrical means to measure time elapsed from closing of said receiver valve means until accumulation of a predetermined volume of condensed vapor in said receiver, as indicated by a signal from said level sensing probe; and
   (l) recorder means to record said time and indicate percent of said liquid sample stream distilling at said known constant temperature.

2. The method of determining the relative amount of a multi-component liquid sample stream distilling at a known temperature and pressure which method comprises:
   (a) flowing said liquid sample stream into a flash distillation zone at a known volumetric rate;
   (b) flash distilling said liquid sample into a vapor and a liquid phase at said known temperature and pressure;
   (c) withdrawing said vapor phase from said flash distillation zone separately from said liquid phase;
   (d) condensing said vapor phase;
   (e) accumulating the resulting condensed vapor phase;
   (f) measuring and recording the time necessary to accumulate a predetermined volume of said condensate; and
   (g) correlating said time and said known volumetric rate to determine the percent of said multi-component sample stream distilling at said temperature.

3. The method of determining the percent of a multi-component liquid sample stream distilling at a known constant temperature and pressure which method comprises:
   (a) pumping said liquid sample stream into a flash distillation zone at a known constant volumetric rate;
   (b) flash distilling said liquid sample into a vapor and a liquid phase at said known constant temperature and pressure;
   (c) sensing the temperature of the vapor phase in said flash distillation zone;
   (d) maintaining the temperature of the vapor phase in said flash distillation zone at said known constant temperature by imparting heat to said liquid sample stream prior to entry of said stream into said distillation zone in response to sensed changes in temperature in the main body of vapor in said distillation zone;
   (e) maintaining said sample stream in the liquid phase prior to entry of said stream into said distillation zone;
   (f) withdrawing the vapor phase from said distillation zone separately from said liquid phase;
   (g) withdrawing the liquid phase from said distillation zone;
   (h) condensing said vapor phase withdrawn from said distillation zone;
   (i) accumulating condensed vapor;
   (j) measuring the length of time necessary to accumulate a predetermined volume of condensed vapor; and
   (k) correlating said time and said known constant volumetric rate to determine the percent of liquid sample stream distilling at said known constant temperature.

4. Apparatus for determining the relative amount of a multi-component liquid sample stream distilling at a known temperature and pressure which apparatus comprises:
   (a) means to flash distill at least a portion of said liquid sample stream at said known temperature and pressure into a vapor phase and a liquid phase;
   (b) means to flow said liquid sample stream into said flash distilling means at a known flow rate;
   (c) means to withdraw said vapor phase and said liquid phase separately from said flash distilling means;
   (d) means to accumulate at least one of said withdrawn streams; and
   (e) means to measure the time necessary to accumulate a predetermined amount of said withdrawn stream.

References Cited by the Examiner

UNITED STATES PATENTS

| 1,664,977 | 4/1928 | Hanna | 208—361 |
| 2,350,006 | 3/1944 | Wolfner. | |
| 2,949,768 | 8/1960 | Ryant et al. | 73—53 |
| 2,958,220 | 11/1960 | Kalish | 73—53 |
| 3,123,541 | 3/1964 | Donnell | 73—53 X |

RICHARD C. QUEISSER, *Primary Examiner.*

DAVID SCHONBERG, *Examiner.*

UNITED STATES PATENT OFFICE
CERTIFICATE OF CORRECTION

Patent No. 3,221,542 December 7, 1965

Sixt Frederick Kapff

It is hereby certified that error appears in the above numbered patent requiring correction and that the said Letters Patent should read as corrected below.

Column 4, TABLE 1, fourth column, line 7 thereof, for "413° F." read -- 431° F. --.

Signed and sealed this 27th day of September 1966.

(SEAL)
Attest:

ERNEST W. SWIDER
Attesting Officer

EDWARD J. BRENNER
Commissioner of Patents